US010175779B2

(12) United States Patent
Nikolsky et al.

(10) Patent No.: US 10,175,779 B2
(45) Date of Patent: Jan. 8, 2019

(54) DISCRETE CURSOR MOVEMENT BASED ON TOUCH INPUT (71) Applicant: HEWLETT-PACKARD DEVELOPMENT COMPANY, L.P., Houston, TX (US)

(72) Inventors: Oleg Vassilievich Nikolsky, Pontiac, MI (US); Kas Kasravi, Pontiac, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/306,561

(22) PCT Filed: May 28, 2014

(86) PCT No.: PCT/US2014/039735
§ 371 (c)(1),
(2) Date: Oct. 25, 2016

(87) PCT Pub. No.: WO2015/183257
PCT Pub. Date: Dec. 3, 2015

(65) Prior Publication Data
US 2017/0068335 A1 Mar. 9, 2017

(51) Int. Cl.
G06F 1/16 (2006.01)
G06F 3/0346 (2013.01)
G06F 3/03 (2006.01)
G06F 3/0484 (2013.01)
G06F 3/0488 (2013.01)

(52) U.S. Cl.
CPC .............. G06F 3/0346 (2013.01); G06F 1/16 (2013.01); G06F 3/03 (2013.01); G06F 3/0484 (2013.01); G06F 3/04883 (2013.01); G06F 2203/04104 (2013.01)

(58) Field of Classification Search
CPC ........ G06F 3/0346; G06F 1/16; G06F 3/0484; G06F 3/04883; G06F 3/03; G06F 2203/04104
See application file for complete search history.

(56) References Cited

U.S. PATENT DOCUMENTS 6,369,794 B1  4/2002  Sakurai et al.
8,442,797 B2  5/2013  Kim et al.
(Continued)

FOREIGN PATENT DOCUMENTS

CN  101192110  6/2008
CN  102169401  8/2011
(Continued)

Primary Examiner — Shaheda Abdin
(74) Attorney, Agent, or Firm — HPI Patent Department (57) ABSTRACT In one example implementation according to aspects of the present disclosure, a method may include detecting, by a computing system, a touch input on the computing system by analyzing a change in a data stream from a sensor of the computing system by applying a first signal de-noising algorithm to the data stream. The method may further include determining, by the computing system, the nature of the detected touch input. Additionally, the method may include generating, by the computing system, a discrete cursor movement from a set of discrete cursor movements based on the determined nature of the detected touch input.

19 Claims, 6 Drawing Sheets (56) References Cited

U.S. PATENT DOCUMENTS

| | | | |
|---|---|---|---|
| 2002/0167699 A1* | 11/2002 | Verplaetse | G06F 1/1626 |
| | | | 398/154 |
| 2005/0212767 A1 | 9/2005 | Marvit et al. | |
| 2006/0097983 A1 | 5/2006 | Haggman et al. | |
| 2006/0195791 A1* | 8/2006 | Johanson | G06F 3/0486 |
| | | | 715/740 |
| 2009/0288043 A1 | 11/2009 | Willis | |
| 2010/0029255 A1 | 2/2010 | Kim et al. | |
| 2010/0033428 A1 | 2/2010 | Ahn et al. | |
| 2010/0315337 A1 | 12/2010 | Ferren et al. | |
| 2011/0018806 A1* | 1/2011 | Yano | G06F 3/0488 |
| | | | 345/163 |
| 2013/0074012 A1 | 3/2013 | Tseng | |
| 2013/0222645 A1 | 8/2013 | Bilcu | |
| 2014/0078108 A1 | 3/2014 | Hotelling et al. | |

FOREIGN PATENT DOCUMENTS

| | | |
|---|---|---|
| CN | 102439404 | 5/2012 |
| CN | 102484664 | 5/2012 |
| CN | 102763057 | 10/2012 |
| CN | 103164050 | 6/2013 |
| CN | 103200304 | 7/2013 |

* cited by examiner

| Touch Input | Text Entry Application | Gaming Application | CAD Application |
|---|---|---|---|
| Single Tap Right Edge | Move cursor one position left | Move character one position left | Move cursor 1mm left |
| Single Tap Left Edge | Move cursor one position right | Move character one position right | Move cursor 1mm right |
| Single Tap Top Edge | Move cursor one line down | Move character one position down | Move cursor 1mm down |
| Single Tap Bottom Edge | Move cursor one line up | Move character one position up | Move cursor 1mm up |
| Double Tap Right Edge | Move cursor to beginning of line | Fire primary weapon | Define upper-right edge of a selection box |
| Double Tap Left Edge | Move cursor to end of line | Fire secondary weapon | Define lower-left edge of a selection box |
| Triple Tap Right Edge | Select word to the left of cursor | Deploy shield | Select object in selection box |
| Triple Tap Left Edge | Select word to the right of cursor | Reload | Delete object in selection box |

DISCRETE CURSOR MOVEMENT BASED ON TOUCH INPUT

BACKGROUND

Computing devices such as laptops, smart phones, and tablets have increased in popularity. Many individuals own at least one (if not multiple) of these types devices, which may frequently be used for personal tasks such as checking email, browsing the Internet, taking photos, playing games, and other such activities. Additionally, these devices are also being used to perform basic business related tasks, such as email, accessing business web services, and internet browsing.

BRIEF DESCRIPTION OF THE DRAWINGS

The following detailed description references the drawings, in which.

DETAILED DESCRIPTION

Computing devices for computing systems) such as laptops, smart phones, and tablets have increased in popularity. Many individuals own at least one (if not multiple) of these types devices, which may frequently be used for persona/ tasks such as checking email, browsing the Internet, taking photos, playing games, and other such activities. Additionally, these devices are also being used to perform basic business related tasks, such as email, accessing business web services, and Internet browsing.

To perform the desired tasks and functions, users interact with these computing systems by providing a variety of inputs. For example, a user may enter text on a physical keyboard attached to such a computing system. Similarly, the user may enter text on a "soft" keyboard that appears on a touch display of such a computing system. For instance, a user of a mobile smart phone may wish to compose an email or a text message. To do so, the user may select the appropriate application (e.g., email application or text messaging application) by clicking or tapping on the mobile smart phone's touch screen. Once the appropriate application is running, the user may then proceed to input the desired text using the soft keyboard displayed on the touch screen by selecting or tapping the appropriate characters. Users may perform other tasks on their computing systems that utilize user inputs such as office productivity software, gaming software, image editing software, computer aided design software, and the like.

To provide such inputs, the users of such devices face the limitations of touch screen implementations. For instance, a user may frequently mistype a word because the on-screen keyboard is small in comparison to the user's fingers. That is, a user may mean to press one key and instead press an adjacent key. To correct this error, the user moves the cursor back to the position of the mistake and makes the appropriate correction. However, moving the cursor to a particular location can be difficult on such touch screen devices. More generally, touch screen devices lack precise and discrete input ability, specifically as it relates to the position and movement of a cursor. This shortcoming limits and negatively affects the manner in which applications are implemented and used, limits the usefulness of the computing system, and causes user frustration.

Currently, techniques for providing user input to a computing system include touchscreens, mice, styluses, mechanical buttons, software buttons, and voice commands. These current techniques fail to provide precise cursor control on touchscreen devices. For example, touchscreens are inherently inaccurate, mice and styluses need to be carried as an extra device, software or screen buttons take up space and add to the cost of the computing system, and voice command are not intended for nor do they provide, precision cursor control.

Various implementations are described below by referring to several examples of determining which of a discrete cursor movement to implement based on the analysis of a signal generated by a sensor responsive to a touch input. In one example implementation according to aspects of the present disclosure, a method may include detecting, by a computing system, a touch input on the computing system by analyzing a change in a data stream from a touch sensor of the computing system by applying a first signal de-noising algorithm to the data stream. The method may further include determining, by the computing system, the nature of the detected touch input. Additionally, the method may include generating, by the computing system, a discrete cursor movement from a set of discrete cursor movements based on the determined nature of the detected touch input.

In another example implementation according to aspects of the present disclosure, a computing system may include a processing resource and a sensor to generate a signal responsive to detecting a touch input on the computing system. The computing system may further include a touch analysis module to analyze the signal generated by the sensor by applying a signal de-noising algorithm to the signal generated by the sensor. Additionally, the computing system may include a discrete cursor movement module to determine which of a discrete cursor movement from a set of discrete cursor movements to cause to be implemented based at least in part on the analysis of the signal generated by the sensor.

In another example implementation according to aspects of the present disclosure a computing system may include a plurality of accelerometers further including a first accelerometer to generate a first signal responsive to detecting a touch input on the computing system, a second accelerometer to generate a second signal responsive to detecting a touch input on the computing system, and a third accelerometer to generate a third signal responsive to detecting a touch input on the computing system. The computing system may also include a touch analysis module to analyze at least one of the signals generated by the plurality of accelerometers by applying a signal de-noising algorithm to the signal generated by the accelerometer. Additionally, the computing system may include a discrete cursor movement module to determine which of a discrete cursor movement from a set of discrete cursor movements to cause to be implemented based at least in part on the analysis of the signals generated by the plurality of accelerometer.

In some implementations, the discrete cursor movement techniques described herein save the user frustration when discrete or high precision cursor movement is needed. Moreover, applications may provide increased functionality as a result of the ability to provide discrete cursor movements without the added cost of additional hardware components. These and other advantages will be apparent from the description that follows.

Figure 1:
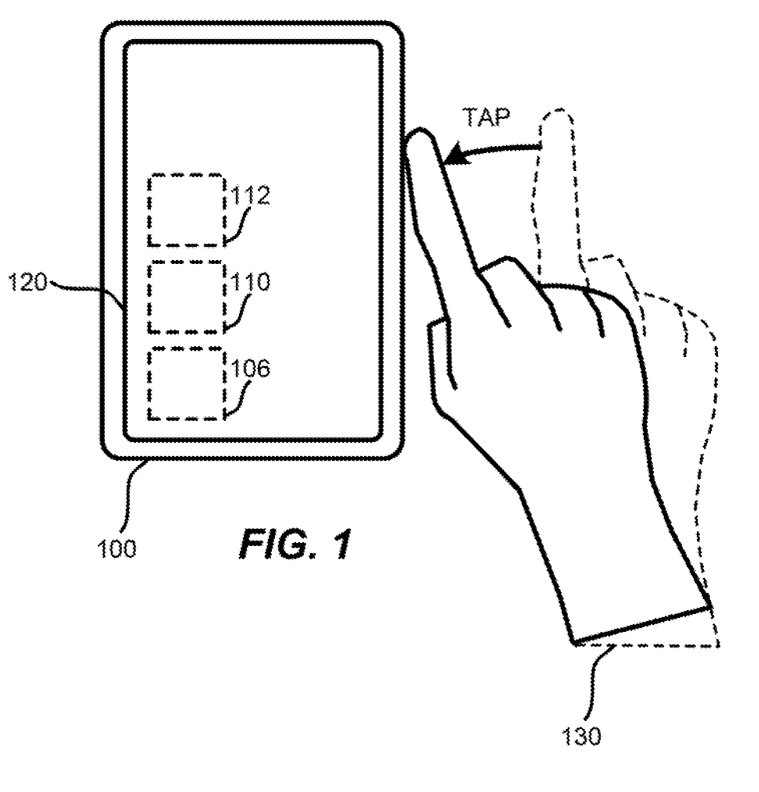
FIG. 1 illustrates a block diagram of a computing system having a sensor, a touch input analysis module, a discrete cursor movement module according to examples of the present disclosure.

FIG. 1 illustrates a block diagram of a computing system 100 having a touch input analysis module and a discrete cursor movement module according to examples of the present disclosure. In particular, the computing system 100 may detect a touch input for "tap") from a user hand 130 or in another appropriate way such as by a user finger, hand, head, arm, etc.), analyze a signal generated by a sensor 106, and determine which of a discrete cursor movements to cause to be implemented. Thus, when a user taps the computing system 100, a discrete cursor movement is implemented on the device, causing the cursor to move a discrete amount (or to a particular location), move to a discrete menu item or button, or to discretely select an object, menu item, or button, or another similar action is performed.

FIG. 1 includes particular components, modules, etc. according to various examples. However, in different implementations, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs) embedded controllers, hardwired circuitry, etc.), or some combination of these.

It should be understood that the computing system 100 may include any appropriate type of computing device, including for example smartphones, tablets, desktops, laptops, workstations, servers, smart monitors, smart televisions, digital signage, scientific instruments, retail point of sale devices, video walls, imaging devices, peripherals, wearable computing devices, or the like.

In the example illustrated in FIG. 1, the computing system 100 represents a mobile device, such as a smart phone or tablet computer, although other suitable devices are also possible. The computing system 100 includes a sensor 106, a touch input analysis module 110, a discrete cursor movement module 112, and a display 120. The sensor 106, the touch input analysis module 110, and the discrete cursor movement modules 112 are shown with dashed lines to represent that the components are partially or wholly within the computing system 100 and may not be visible externally to the computing system 100. In other examples, the computing system 100 may include additional components, such as processing resources, memory resources, additional sensors, and the like. In examples, the sensor 106 may represent a variety of different sensors, including accelerometers, gyroscopes, magnetometer, manometer, and the like.

The touch input analysis module 110 of the computing system 100 analyzes signals generated by a sensor 106 by applying a signal de-noising algorithm to the signal generated by the sensor 106. For example, hand 130 may "tap" or similarly touch a surface of the computing system 100 so as to create a touch input. The touch input is registered by the sensor 106, which generates a signal responsive to the touch input being detected.

Once the touch input or "tap") is detected by the computing system 100 and the signal is generated by the sensor 106, the touch input analysis module 110 analyzes the signal generated by the sensor 106 by applying a signal de-noising algorithm to that signal. For example, the touch input analysis module 110 may apply a discrete wavelet transform algorithm to de-noise the signal generated by the sensor 106. Any noise present in the signal generated by the sensor 106 is reduced and/or removed by the de-noising algorithm. In other examples, the de-noising algorithm may be other than the discrete wavelet transform algorithm, such as by using other types of appropriate wavelet transforms, digital signal processing for time-frequency analysis, or any other suitable transform algorithm such as Kalman filters, recursive least square filters, Bayesian mean square error algorithm, etc. Moreover, in some examples, a custom data filtering algorithm may be implemented.

The touch input analysis module 110 may also analyze whether a multi-touch is detected (that is two or more consecutive touches or taps). The noise present in the signal generated by the sensor 16 responsive to the multi-taps is also reduced and/or removed by the de-noising algorithm. Additionally, the touch input analysis module 110 analyzes which surface of the computing system 100 received the touch. For example, although FIG. 1 illustrates the hand 130 touching the left surface of the computing system 100, any of the left, right, top, and/or bottom surfaces may be similarly tapped or touched. Additionally, the front surface (such as the display 120) and/or the rear surface (not shown) may be similarly tapped or touched in examples.

Figure 3:
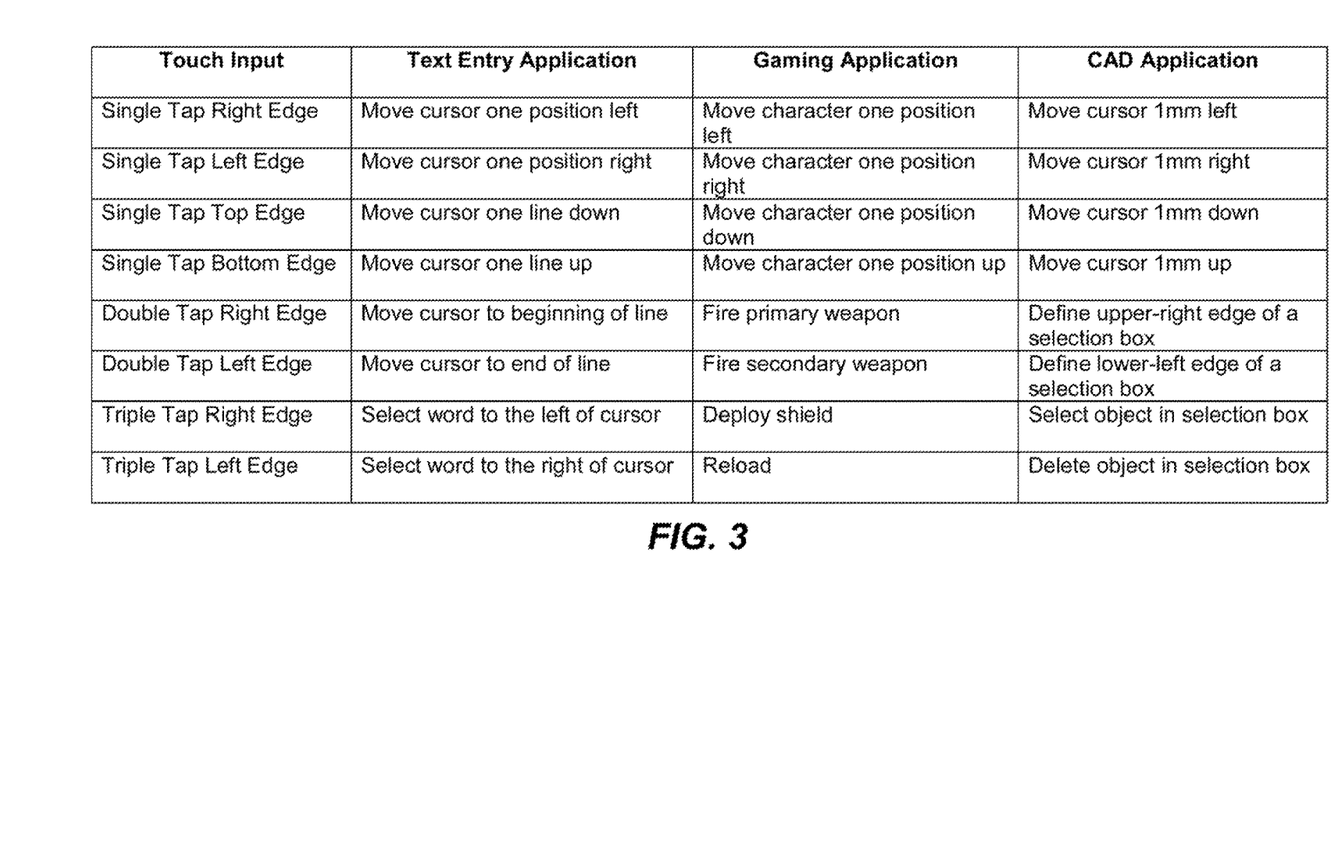
FIG. 3 illustrates a table of discrete cursor movements responsive to certain touch inputs according to examples of the present disclosure.

After the signal generated by the sensor 106 has been de-noised by the touch input analysis module, the discrete cursor movement module 112 determines which of a discrete cursor movement from a set of discrete cursor movements to cause to be implemented based at least in part on the analysis of the signal generated by the sensor 106. That is, the discrete cursor movement module 112 selects from a list or table of predefined discrete cursor movements (such as shown in FIG. 3).

In examples, if a single tap on the left surface of the computing system 100 is detected as shown in FIG. 1), and if the currently executing application on the computing system 100 is a text entry application, the cursor is moved one position to the right (but in other examples, the cursor may be moved to the left instead). In another example, if a double tap on the right surface of the computing system 100 is detected, and if the currently executing application is a computer aided design application, the upper-right bound of a selection box is defined. A double tap on the left surface of the computing system 100 would then define the lower-left bound of the selection box. Of course, any additional examples of discrete cursor movements are possible, some of which are shown in FIG. 3. However, it should be understood that the examples shown are merely illustrative and are not intended to be exhaustive.

The discrete cursor movement module 112 may be (or may include) an application programming interface (API) to provide programmatic instructions for third-party applications (e.g., text entry applications, gaming applications, computer aided design applications, etc.) to map the received touch input for each application. For example, the API may output the specific commands as shown in the following table to the appropriate third-party application. These commands (e.g., T1, B2, K1, F3, etc.) are received by the third-party applications and the appropriate command is implemented. The table merely lists possible commands and nomenclature, and other implementations are possible in other examples.

| Touch input Location | Single Touch | Double Touch | Triple Touch |
|---|---|---|---|
| Top Surface | T1 | T2 | T3 |
| Right Surface | R1 | R2 | R3 |
| Bottom Surface | B1 | B2 | B3 |
| Left Surface | L1 | L2 | L3 |
| Back Surface | K1 | K2 | K3 |
| Front Surface | F1 | F2 | F3 |

In addition, the discrete cursor movement module 112 may determine which of a discrete cursor movement based at least in part on one or more of predictive discrete cursor movements, previous discrete cursor movements, key words or phrases within text proximate to the current cursor position, and other factors.

Figure 2A:
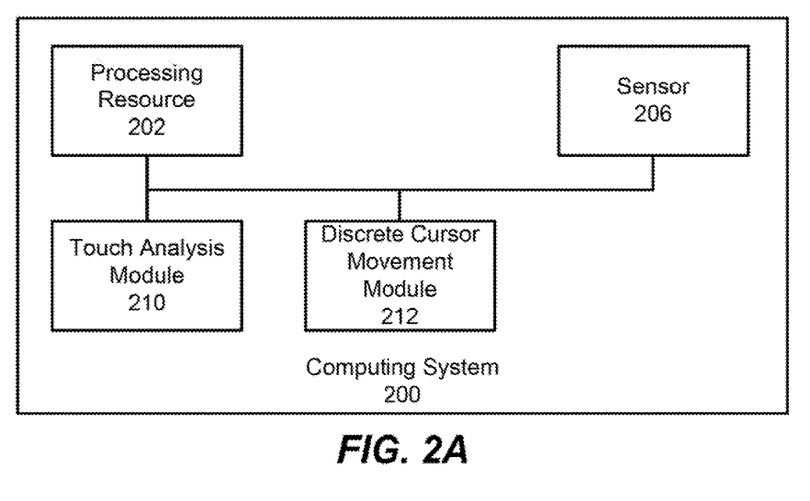
FIGS. 2A and 2B illustrate a block diagram of a computing system having a sensor, a touch input analysis module and a discrete cursor movement module according to examples of the present disclosure.
Figure 2B:
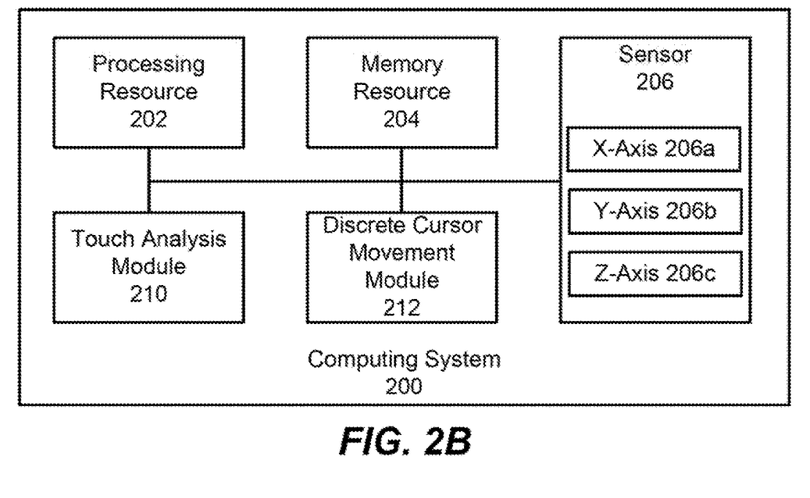

FIGS. 2A and 2B illustrate a block diagram of a computing system 200 having a touch input analysis module and a discrete cursor movement module according to examples of the present disclosure. FIGS. 2A and 2B include particular components, modules, etc. according to various examples. However, in different implementations, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

It should be understood that the computing system 200 may include any appropriate type of computing device, including for example smartphones, tablets, desktops, laptops, workstations, severs, smart monitors, smart televisions, digital signage, scientific instruments, retail point of sale devices, video walls, imaging devices, peripherals, wearable computing devices, or the like.

The computing system 200 may include a processing resource 202 that represents generally any suitable type or form of processing unit or units capable of processing data or interpreting and executing instructions. The instructions may be stored on a non-transitory tangible computer-readable storage medium, such as memory resource 204 of FIG. 2B, or on a separate device (not shown), or on any other type of volatile or non-volatile memory that stores instructions to cause a programmable processor to perform the techniques described herein. Alternatively or additionally, the computing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory. In examples, the computing system of FIGS. 2A and 2B may include a display to display the application running on the computing system 200 and to display the cursor which is being manipulated.

The computing system 200 may also include a sensor 206 to measure acceleration within the computing system 200. The sensor 206 may be a single-axis accelerometer as shown in FIG. 2A, which may detect acceleration along a single-axis. Additionally, although not shown, multiple accelerometers may be implemented, such that acceleration may be detected along multiple axes. In other examples, such as shown in FIG. 2B, the sensor 206 may be a multi-axis accelerometer to detect acceleration in a plurality of directions. As shown in FIG. 2B, the multi-axis accelerometer may detect acceleration along the x-axis 206a, along the y-axis 206b, and/or along the z-axis 206c. As it relates to the present disclosure, detecting acceleration along an axis relates to detecting touch inputs on one of the six surfaces of the computing system (i.e., top, bottom, left, right, front, rear). The sensor 206 generates a signal responsive to detecting the touch input detecting an acceleration). For example, the touch input for tap) results in an impulse or sudden acceleration over a very short timeframe (a high amplitude, short duration pulse). The impulse, as a signal, is distinct from typical movements experienced by such computing systems (e.g., jolting a phone with jogging, tilting the computing system to manipulate a feature of a game, etc.).

In addition to the processing resource 202, the memory resource 204, and the sensor 206 the computing system 200 may include a touch analysis module 210 and a discrete cursor movement module 212. In one example, the modules described herein may be a combination of hardware and programming. The programming may be processor executable instructions stored on a tangible memory resource such as memory resource 204, and the hardware may include processing resource 202 for executing those instructions. Thus memory resource 204 can be said to store program instructions that when executed by the processing resource 202 implement the modules described herein. Other modules may also be utilized as will be discussed further below in other examples.

The touch input analysis module 210 of the computing system 200 analyzes signals generated by a sensor 206 by applying a signal de-noising algorithm to the signal generated by the sensor 106. For example, a hand may "tap" or similarly touch a surface of the computing system 200 so as to create a touch input. The touch input is registered by the sensor 106, which generates a signal responsive to the touch input being detected.

Once the touch input (or "tap") is detected by the computing system 200 and the signal is generated by the sensor 208, the touch input analysis module 210 analyzes the signal generated by the sensor 206 by applying a signal de-noising algorithm to that signal. For example, the touch input analysis module 210 apply a discrete wavelet transform algorithm to de-noise the signal generated by the sensor 206. Any noise present in the signal generated by the sensor 206 is reduced and/or removed by the de-noising algorithm. In other examples, the de-noising algorithm may be other than the discrete wavelet transform algorithm, such as by using other types of appropriate wavelet transforms, digital signal processing for time-frequency analysis, or any other suitable transform algorithm.

The touch input analysis module 210 may also analyze whether multi-touch is detected (that is, two or more consecutive touches or taps). The noise present in the signal generated by the sensor 206 responsive to the multi-taps is also reduced and/or removed by the de-noising algorithm. Additionally, the touch input analysis module 210 analyzes which surface of the computing system 200 received the touch. For example, although FIG. 1 illustrates the hand touching the left surface of the computing system 200 any of the left, right, top, and/or bottom surfaces may be similarly tapped or touched. Additionally, the front surface (such as a display) and/or the rear surface (not shown) may be similarly tapped or touched in examples.

After the signal generated by lie sensor 206 has been de-noised by the touch input analysis module, the discrete cursor movement module 212 determines which of a discrete cursor movement from a set of discrete, cursor movements to cause to be implemented based at least in part on the analysis of the signal generated by the sensor 206. That is, the discrete cursor movement module 212 selects from a list or table of predefined discrete cursor movements (such as shown in FIG. 3).

In examples, if a single tap on the left surface of the computing system 200 is detected (similarly to that shown in FIG. 1), and if the currently executing application on the computing system 200 is a text entry application, the cursor is moved one position to the right (but in other examples, the cursor may be moved to the left instead). In another example, if a double tap on the right surface of the computing system 200 is detected, and if the currently executing application is a computer aided design application, the upper-right bound of a selection box is defined. A double tap on the left surface of the computing system 200 would then define the lower-left bound of the selection box. Of course, any additional examples discrete cursor movements are possible, some of which are shown in FIG. 3. However, it should be understood that the examples shown are merely illustrative and are not intended to be exhaustive.

In addition, the discrete cursor movement module 212 may determine which of a discrete cursor movement based at least in part on one or more of predictive discrete cursor movements, previous discrete cursor movements, key words or phrases within text proximate to the current cursor position, and other factors.

FIG. 3 illustrates a table of discrete cursor movements responsive to certain touch inputs according to examples of the present disclosure. As discussed above, it should be understood that the examples shown are merely illustrative and are not intended to be exhaustive. Additional examples of discrete cursor movements are possible. Moreover, in examples, a user may create his own discrete cursor movements through a settings feature of a computing system such as computing system 100 and/or 200 of FIGS. 1, 2A and 2B. For example, a user may set a single tap on the left surface to take a screen shot in a graphics application, such as a photo gallery or the like. Of course, many additional examples are possible and may be defined by or selected by a user in examples.

Figure 4A:
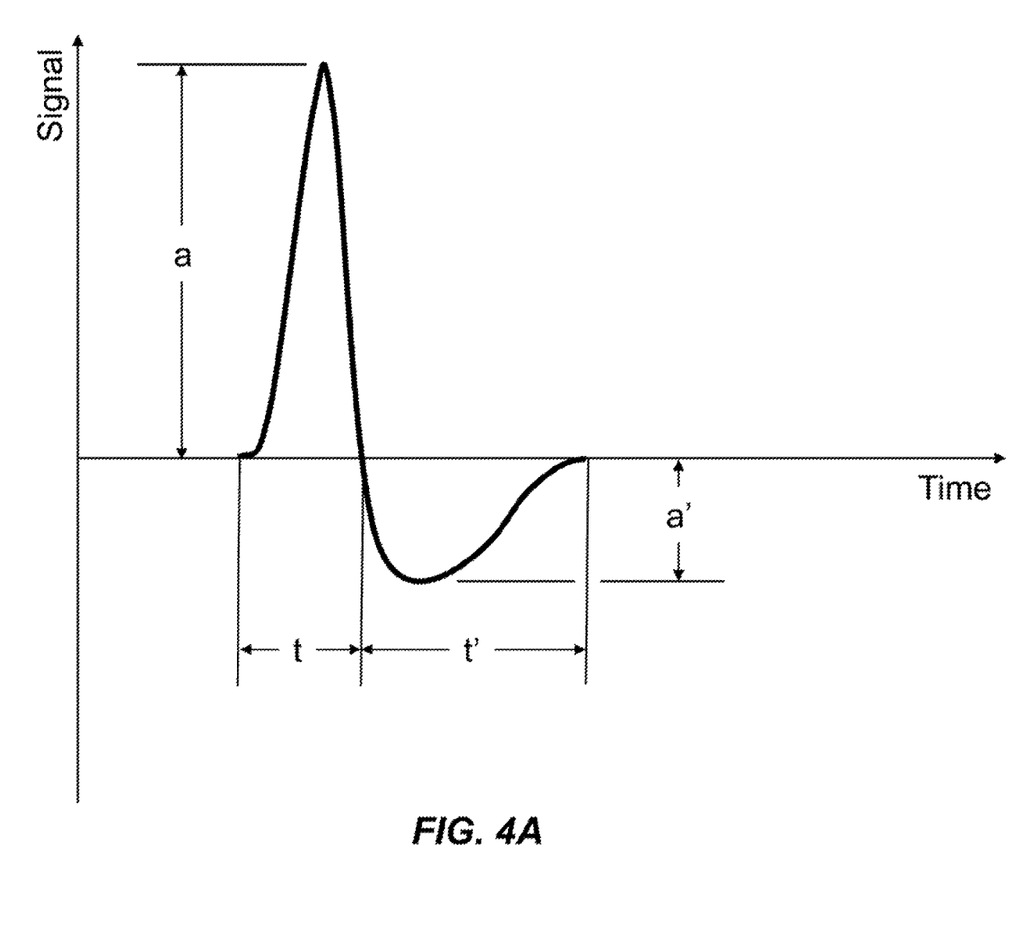
FIGS. 4A and 4B illustrate plot diagrams of a signal generated by a sensor in a computing system having a touch input analysis module and a discrete cursor movement module according to examples of the present disclosure.
Figure 4B:
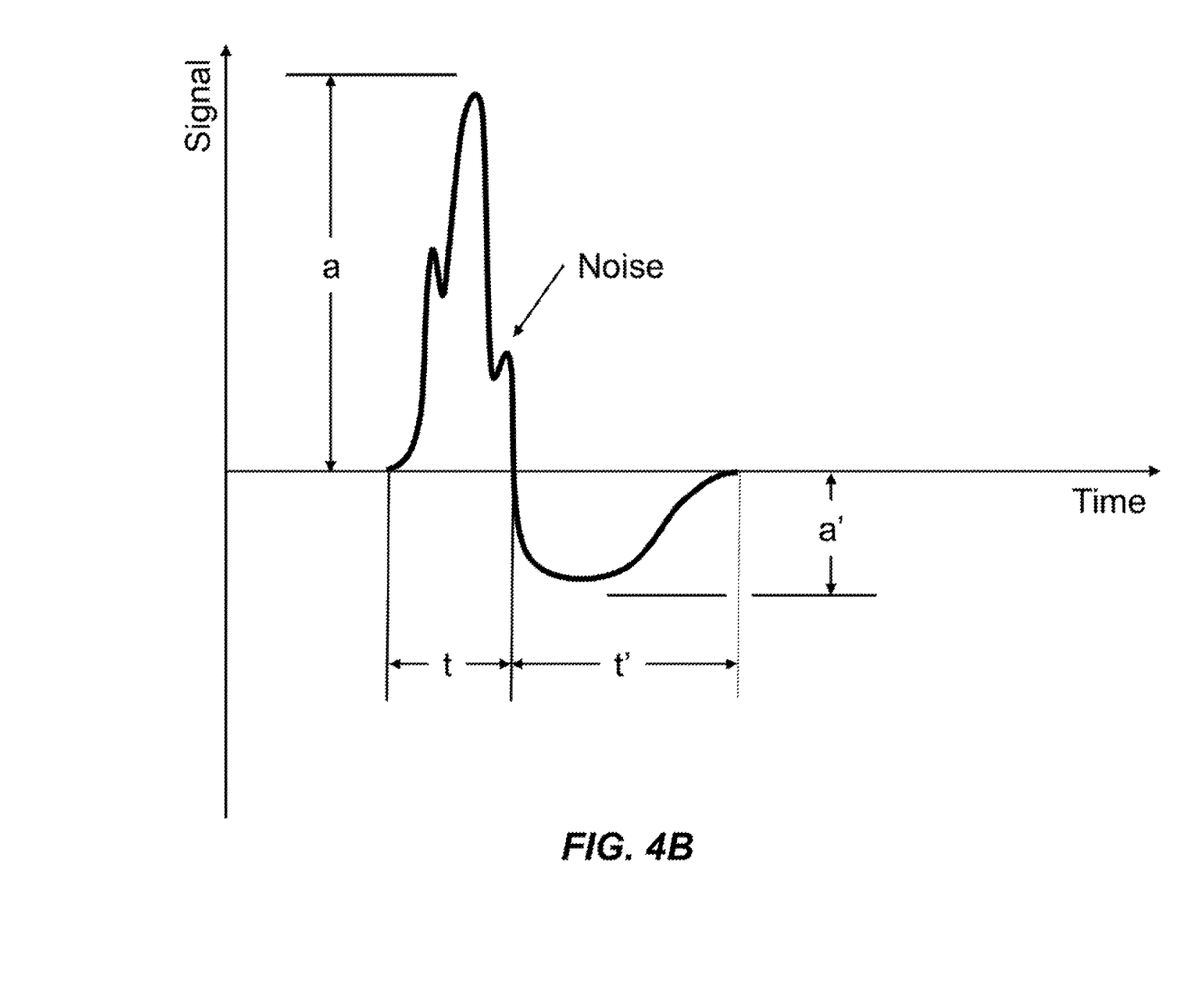

FIGS. 4A and 4B illustrate plot diagrams of a signal generated by an accelerometer, for example, in e computing system having a touch input analysis module and a discrete cursor movement module according to examples of the present disclosure. For example. FIG. 4A illustrates a typical impulse induced by a touch input for tap), where "a" represents the amplitude of the touch input, represents the rebounding effect of the computing system in the opposite direction as a result of the touch input, "t" represents the duration of the touch input, and "t'" represents the duration of the rebounding effect after the touch input. Each axis will behave similarly. The time at which "a" is detected is the indication of the tap. Due to ambient conditions, certain noise may be introduced in the impulse signal as shown in FIG. 4B. Reducing or removing this noise improves the signal and assists in isolating and interpreting the tap. In examples, the values of "a", "a'", "t", and "t'" are determined against suitable thresholds to avoid false-positive taps and/or false-negative taps. It should be understood that the signals illustrated in FIGS. 4A and 4B are merely possible response signals responsive to a touch input and that many variations on the illustrated figures are possible. The variety of signals produced may depend on, among other factors, the material the computing system is made from, the manner in which the user initiates and completes the touch input, the type of sensor used in the computing system, environmental variables, and other factors.

In examples, the touch input analysis module 110 of FIG. 1 or 210 of FIG. 2 may apply a discrete wavelet transform algorithm to de-noise the signal generated by the sensor. Any noise present in the signal generated by the sensor is reduced and/or removed by the de-noising algorithm. In other examples, the de-noising algorithm may be other than the discrete wavelet transform algorithm, such as by using other types of appropriate wavelet transforms, digital signal processing for time-frequency analysis, or any other suitable transform algorithm.

Figure 5:
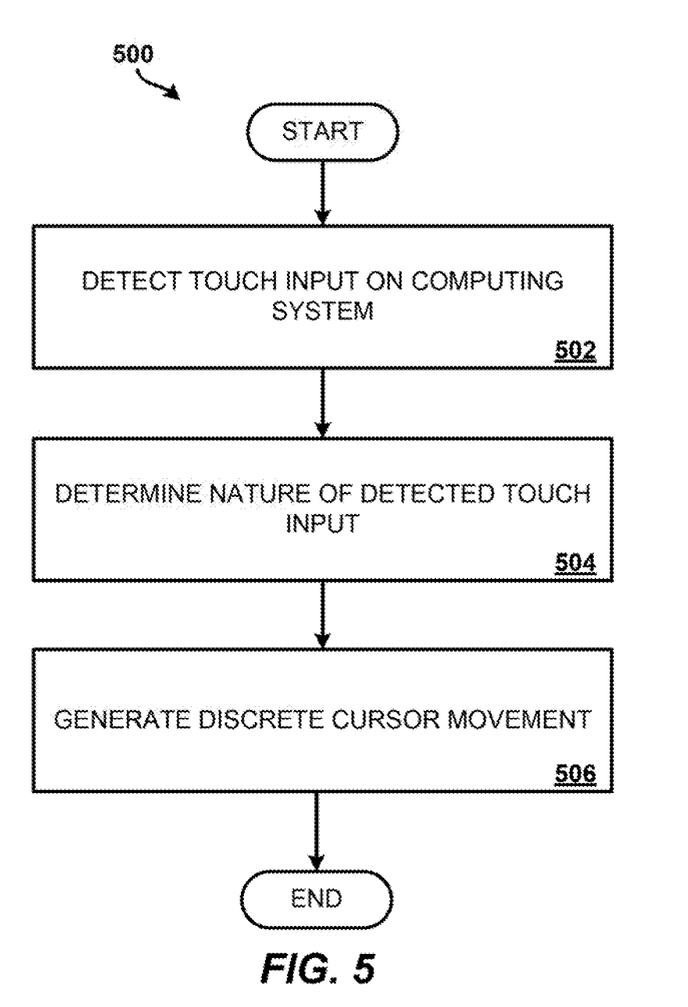
FIG. 5 illustrates a flow diagram of determining which of a discrete cursor movement to implement based on the analysis of a change in data stream generated by a sensor responsive to a touch input according to examples of the present disclosure.

FIG. 5 illustrates a flow diagram of a method 500 for determining which of a discrete cursor movement to implement based on the analysis of a change in a data stream generated by a sensor responsive to a touch input according to examples of the present disclosure. The method 500 may be executed by a computing device or a computing system such as computing system 100 of FIG. 1 or computing system 280 of FIGS. 2A and 2B. In one example, the method 500 may include: detecting, by the computing system, a touch input on the computing system by analyzing a change in a data stream from a sensor of the computing system by applying a first signal de-noising algorithm to the data stream (block 502); determining, by the computing system, the nature of the detected touch input (block 504); and generating, by the computing system, a discrete cursor movement from a set of discrete cursor movements based on the determined nature of the detected touch input (block 506).

At block 502, the method 500 includes detecting a touch input on the computing system. For example, a computing system (e.g., computing system 100 of FIG. 1 or computing system 200 of FIGS. 2A and 2B) may detect a touch input on the computing system by analyzing a change in a data stream from a sensor of the computing system by applying a first signal de-noising algorithm to the data stream. In an example, a user's hand (or other suitable part, such as a head, foot, finger, etc.) may "tap" or similarly touch a surface of the computing system so as to create a touch input. The touch (which may also be a multiple touch) input is registered by the sensor, which generates a signal (or pulse) responsive to the touch input being detected. The signal (or pulse) is included in the data stream of the computing system. In an example, the touch input analysis module may apply a discrete wavelet transform algorithm or other suitable algorithm to detect a touch input on the computing system by analyzing a change in data stream. A second de-noising algorithm (which may be the same as or different than the first de-noising algorithm) may be utilized or applied to the data stream in order to detect the touch input. In this way, the touch input is detected among the variety of other signals detected by the sensors of the computing system. The method 500 then continues to block 504.

At block 504, the method 500 includes determining the nature of the detected touch input. For example, a computing system (e.g., computing system 100 of FIG. 1 or computing system 200 of FIGS. 2A and 2B) may determine the nature of the detected touch input. After the signal generated by the sensor has been de-noised and a touch input has been detected, a discrete cursor movement module as in the computing system 100 of FIG. 1 or computing system 200 of FIGS. 2A and 2B determines the nature of the detected touch input. More particularly, it may be determined which surface of the computing system received the touch input and whether the touch input was a single or multiple touch input. Once the nature of the detected touch input has been determined, the method 500 continues to block 506.

At block 506, the method 500 includes generating a discrete cursor movement. For example, a computing system (e.g., computing system 100 of FIG. 1 or computing system 200 of FIGS. 2A and 2B) may generate a discrete cursor movement from a set of discrete cursor movements based on the determined nature of the detected touch input. That is, the discrete cursor movement module selects from a list or table of predefined discrete cursor movements (such as shown in FIG. 3), which may be customizable to the user. The cursor is then moved appropriately, such as via an application programming interface to a third-party program on the computing system.

Additional processes also be included. For example, the method 500 may include de-noising a data stream from a sensor of a computing system. In such an example, a computing system (e.g., computing system 100 of FIG. 1 or computing system 200 of FIGS. 2A and 2B) may de-noise a data stream from the sensor of a computing system prior to detecting the touch input by applying a second signal de-noising algorithm to the data stream. Sensors, such as accelerometers, gyroscopes, magnetometers, manometers, etc., may continually sense movements and generate a data stream indicative of these detected movements. In an example, the touch input analysis module may apply a discrete wavelet transform algorithm or other suitable algorithm to de-noise the signal generated by the sensor. Any noise present in the signal generated by the sensor is reduced and/or removed by the de-noising algorithm. It should be understood that the processes depicted in FIG. 5 represent illustrations, and that other processes may be added or existing processes may be removed, modified, or rearranged without departing from the scope and spirit of the present disclosure.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended tote included within the scope of the present disclosure, and all possible claims to individual aspects or combinations of elements or steps are intended to be supported by the present disclosure.

What is claimed is:

1. A method comprising:
   detecting, by a computing system, a touch input on the computing system comprising a single tap on a side surface of a housing for a display surface of the computing system, the detecting comprising analyzing a change in a data stream from a sensor of the computing system by applying a first signal de-noising algorithm to the data stream;
   determining, by the computing system, the nature of the detected touch input; and
   generating, by the computing system, a discrete cursor movement from a set of discrete cursor movements based on the determined nature of the detected touch input, wherein generating the discrete cursor movement comprises accessing a table in which different touch inputs are respectively matched to different discrete cursor movements, the method further comprising generating the discrete cursor movement based on a specified cursor movement matched in the table to the detected touch input.

2. The method of claim 1, further comprising:
   de-noising, by the computing system, the data stream from the sensor of the computing system prior to detecting the touch input by applying a second signal de-noising algorithm to the data stream.

3. The method of claim 1, wherein the touch input is a multiple touch input.

4. The method of claim 1, wherein the set of discrete cursor movements is customizable.

5. The method of claim 1, wherein determining the nature of the detected touch input includes determining upon which surface of the computing system the touch input was received.

6. A computing system comprising:
   a processing resource;
   an accelerometer to generate a signal responsive to detecting a touch input on the computing system;
   a touch analysis module to analyze the signal generated by the accelerometer by applying a signal de-noising algorithm to the signal generated by the accelerometer; and
   a discrete cursor movement module to determine, from a table in which different discrete cursor movements are respectively matched to different types of touch input, which discrete cursor movement is to be implemented based at least in part on a type of touch input identified by the analysis of the signal generated by the accelerometer.

7. The computing system of claim 6, further comprising:
   a second accelerometer to generate a second signal responsive to detecting a touch input on the computing system; and
   a third accelerometer to generate a third signal responsive to detecting a touch input on the computing system.

8. The computing system of claim 7,
   wherein the signal generated by the accelerometer represents a touch input in an x-axis direction,
   wherein the second signal generated by the second accelerometer represents a touch input in a y-axis direction, and
   wherein the third signal generated by the third accelerometer represents a touch input in a z-axis direction.

9. The computing system of claim 8, the touch analysis module further to analyze the second signal generated by the second accelerometer by applying the de-noising algorithm to the second signal generated by the second accelerometer, and to analyze the third signal generated by the third accelerometer by applying the de-noising algorithm to the third signal generated by the third accelerometer.

10. The computing system of claim 9, the discrete cursor movement module to determine which of a discrete cursor movement from a set of discrete cursor movements to cause to be implemented based at least in part on the analysis of the signal generated by the accelerometer, based at least in part on the analysis of the second signal generated by the second accelerometer, and based at least in part on the analysis of the third signal generated by the third accelerometer.

11. The computing system of claim 6, further comprising an application programming interface (API) of the discrete cursor movement module to provide programmatic instructions to applications.

12. A computing system comprising:
a sensor;
a touch analysis module to analyze at least one of the signals generated by the sensor by applying a signal de-noising algorithm to the signal to identify a touch input to the computing system; and
a discrete cursor movement module to determine which discrete cursor movement from a predefined set of discrete cursor movements to cause to be implemented based at least in part on the analysis of the signals generated by the sensor and based on which application is currently executing on the computing system when the touch input is identified.

13. The computing system of claim 12, wherein the sensor comprises a multi-axis accelerometer.

14. The computing system of claim 12, wherein the touch input is a multiple touch input.

15. The computing system of claim 12, wherein the signal de-noising algorithm is a discrete wavelet transform algorithm.

16. The computing system of claim 12, wherein the set of discrete cursor movements is customizable.

17. The method of claim 1, further comprising generating the discrete cursor movement based on the determined nature of the detected touch input and a currently executing application on the computing system.

18. The method of claim 1, wherein the nature of the touch input comprises a single tap to a left side surface of the computing system and the discrete cursor movement correspondingly comprises movement of the cursor laterally by one position.

19. The computing system of claim 12, wherein the predefined set of discrete cursor movements comprises a table in which different touch inputs are respectively matched to different discrete cursor movements.

* * * * *